United States Patent
Cho et al.

(10) Patent No.: US 8,164,675 B2
(45) Date of Patent: Apr. 24, 2012

(54) APPARATUS AND METHOD FOR REMOVING MOIRE PATTERN OF DIGITAL IMAGING DEVICE

(75) Inventors: Woo-jong Cho, Suwon-si (KR);
Seong-deok Lee, Suwon-si (KR);
Mun-cheol Choi, Hwaseong-si (KR);
Moon-sik Jeong, Seongnam-si (KR);
Jung-bum Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 429 days.

(21) Appl. No.: 12/103,929

(22) Filed: Apr. 16, 2008

(65) Prior Publication Data

US 2009/0185755 A1  Jul. 23, 2009

(30) Foreign Application Priority Data

Jan. 21, 2008  (KR) ........................ 10-2008-0006291

(51) Int. Cl.
*H04N 5/225* (2006.01)
*G06K 9/40* (2006.01)
(52) U.S. Cl. ...................................... 348/340; 382/264
(58) Field of Classification Search .......... 348/336–344; 382/264
See application file for complete search history.

(56) References Cited

U.S. PATENT DOCUMENTS

| | | | | |
|---|---|---|---|---|
| 4,611,243 A | * | 9/1986 | Morisawa et al. | 348/342 |
| 5,834,761 A | * | 11/1998 | Okada et al. | 250/208.1 |
| 5,969,757 A | * | 10/1999 | Okada et al. | 348/219.1 |
| 5,991,004 A | * | 11/1999 | Wallace et al. | 355/53 |
| 6,236,430 B1 | * | 5/2001 | Suzuki et al. | 348/219.1 |
| 6,831,995 B1 | * | 12/2004 | Asano et al. | 382/141 |
| 7,194,105 B2 | * | 3/2007 | Hersch et al. | 382/100 |
| 7,440,196 B2 | * | 10/2008 | Kobayashi | 359/691 |

FOREIGN PATENT DOCUMENTS

| | | |
|---|---|---|
| JP | 5-93888 | 4/1993 |
| JP | 8-86967 | 4/1996 |
| JP | 10-70677 | 3/1998 |
| JP | 2001-188202 | 7/2001 |
| KR | 100146260 | 5/1998 |

* cited by examiner

*Primary Examiner* — Trung Diep
(74) *Attorney, Agent, or Firm* — Staas & Halsey LLP

(57) ABSTRACT

An apparatus for and a method of removing a moire pattern of a digital imaging device are provided. It is determined whether or not a moire pattern is created based on an image frequency of a preview image and a spatial frequency of an image sensor, and when it is determined that a moire pattern is generated, an optical path of light incident to an image sensor is slightly changed to remove the moire pattern. Accordingly, image quality deterioration can be improved, and a problem of unnecessary filtering that causes deterioration of resolution even when there is no moire pattern can be enhanced.

8 Claims, 5 Drawing Sheets

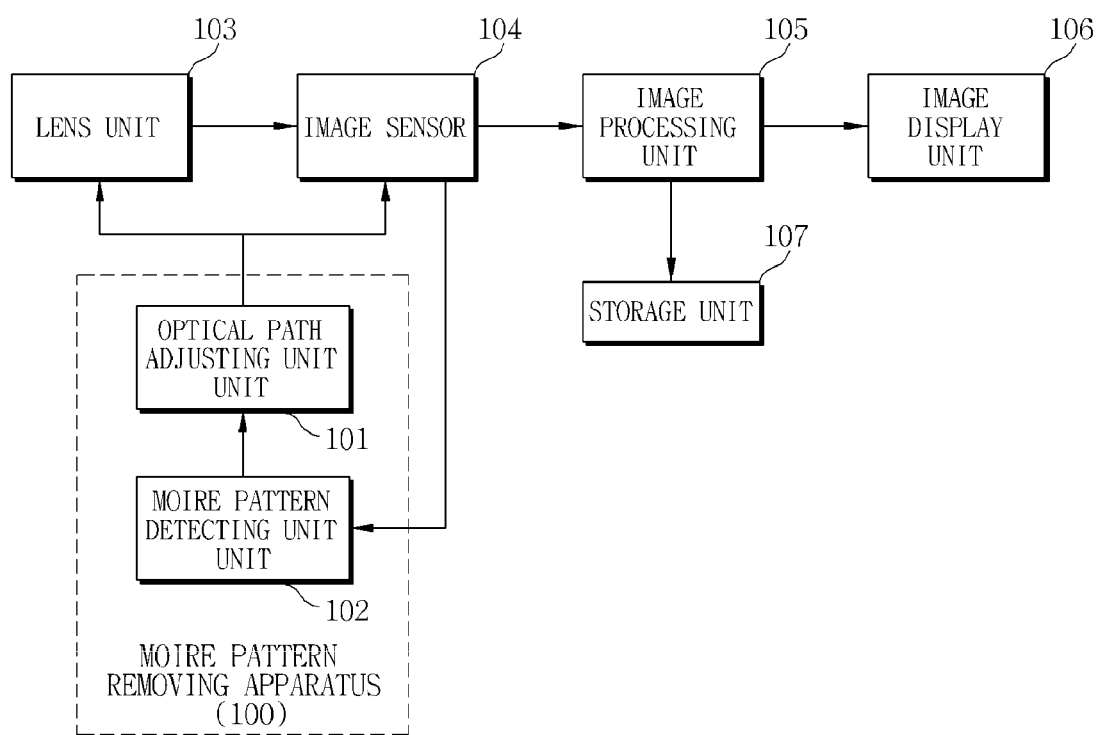

APPARATUS AND METHOD FOR REMOVING MOIRE PATTERN OF DIGITAL IMAGING DEVICE

CROSS-REFERENCE TO RELATED APPLICATIONS

This application claims priority from Korean Patent Application No. 10-2008-0006291, filed on Jan. 21, 2008, the disclosure of which is incorporated herein in its entirety by reference.

BACKGROUND OF THE INVENTION

1. Field of the Invention

The present invention relates to an apparatus and method for removing a moire pattern, and more particularly, to an apparatus and method for removing a moire pattern from a digital image of a digital imaging device by means of low-pass filtering.

2. Description of the Related Art

A digital imaging device generally photographs an object using an image pick-up device which has a grid structure. A charge-coupled device (CCD) is a typical image pick-up device used as a digital imaging device. A CCD is an image sensor that projects an image of an object onto a particular solid-state device by use of an optical system and electrically scans the projected image to convert light signals into electric signals.

Since a digital imaging method using an image pick-up device enables an image to be obtained as soon as an object is photographed and the photographed image is easy to store, it is widely used in personal cameras, cameras mounted in mobile phones, and the like.

However, unlike an analog imaging device such as a film camera, a digital imaging device can have a moire pattern due to the grid structure of an image sensor. A moire pattern is an undesirable irregular image, which is caused by interference between high frequency components of a repeated pattern of an object to be photographed in a region around a spatial frequency of an image sensor.

Conventionally, a method using an optical low-pass filter (OLPF), that is, a birefringent device, is used to remove a moire pattern. In this method, incident light is divided into more than two light beams with different refraction angles by using the OLPF and then the light beams are focused on an image sensor.

However, since an additional birefringent device is required, the size of an optical system increases. In particular, filtering is always performed even when there is no moire pattern generated so that the sharpness of an image can deteriorate.

Recently, although a method of processing image data in a digitized manner in an image processing chip has been suggested in order to remove a moire pattern, this method can reduce the overall performance of the digital imaging device due to the additional image processing procedure.

SUMMARY OF THE INVENTION

An aspect of the present invention provides an apparatus and method for removing a moire pattern only when necessary, without deteriorating resolution, for a digital imaging device.

According to an aspect of the present invention, when it is determined that a moire pattern is generated, the moire pattern can be removed by slightly changing an optical path of light incident to an image sensor to perform low-pass filtering.

Additional aspects of the invention will be set forth in the description which follows, and in part will be apparent from the description, or may be learned by practice of the invention.

An aspect of the present invention discloses an apparatus for removing a moire pattern of a digital imaging device, the apparatus comprising: a moire pattern detecting unit which determines whether or not a moire pattern is generated, using an image frequency of a preview image and a spatial frequency of an image sensor; and an optical path adjusting unit which changes an optical path of light incident to the image sensor to perform low-pass filtering when it is determined by the moire detecting unit that a moire pattern is generated.

The optical path adjusting unit may include an optical filter or total reflection prism and the optical path may be changed by the rotation of the optical filter or the total reflection prism. The optical path adjusting unit may move a position of the image sensor or a lens unit that transfers light to the image sensor to change the optical path.

The optical path adjusting unit may move the optical path by a distance of at least one pixel while the image sensor is exposed to light under the control of the moire pattern detecting unit.

The moire pattern detecting unit may determine that a moire pattern is created when an image frequency of the preview image is in a particular region around a spatial frequency of the image sensor. The moire pattern detecting unit may determine that a moire pattern is created if the image frequency of the preview image is present in a region ranging between ±25 percent of a spatial frequency of the image sensor.

An aspect of the present invention also discloses a method of removing a moire pattern of a digital imaging device, the method comprising: obtaining an image frequency of a preview image; determining whether or not a moire pattern is created by using the obtained image frequency of the preview image and a spatial frequency of the image sensor; and removing a moire pattern by changing an optical path of light incident to the image sensor when it is determined that a moire pattern is present.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

FIG. 1 is a block diagram showing a structure of an apparatus for removing a moire pattern of a digital imaging device according to an embodiment of the present invention;

DETAILED DESCRIPTION OF EXEMPLARY EMBODIMENTS

Figure 2A:
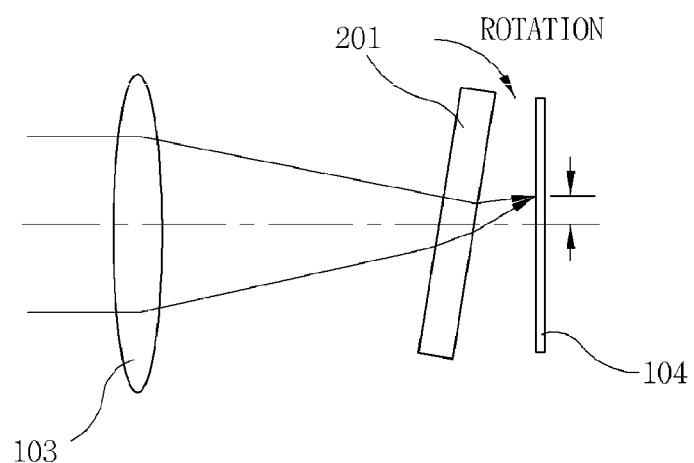
FIGS. 2A and 2B show a structure of the optical path adjusting unit.

The invention is described more fully hereinafter with reference to the accompanying drawings, in which exemplary embodiments of the invention are shown. Hereinafter, in describing the present invention, detailed descriptions of relevant functions or structures well-known to those skilled in the art will be omitted when it is considered that the descriptions obscure the point of the present invention. The terms used herein are defined in consideration of the functions of elements in the present invention, and may be varied according to the intentions or the customs of a user and an operator.

FIG. 1 is a block diagram showing a structure of an apparatus 100 for removing a moire pattern of a digital imaging device according to an embodiment of the present invention. Referring to FIG. 1, the digital imaging device includes a lens unit 103, an image sensor 104, an image processing unit 105, an image display unit 106, and a storage unit 107. The digital imaging device may be a personal digital camera, a built-in camera in a mobile phone, and a reverse guide camera mounted in the rear of a vehicle.

When the digital imaging device photographs a particular object, light from the outside passes through the lens unit 103 and is transferred to the image sensor 104, and the image sensor 104 converts the transferred light signal into an electric image signal. The converted image signal is processed by the image processing unit 105 and then displayed on the image display unit 106 or stored in the storage unit 107.

In this case, when an object to be photographed has repetitive patterns, a moire pattern can be created due to interference between high-frequency components in the course of digitizing an image by the image sensor 104, since the image sensor 104 contains a plurality of image pick-up devices (for example, CCD sensors or complementary metal oxide semiconductor (CMOS) sensors) which are arranged in a grid pattern.

The apparatus 100 for removing a moire pattern includes an optical path adjusting unit 101 and a moire pattern detecting unit 102 as illustrated in FIG. 1.

The optical path adjusting unit 101 performs low-pass filtering on light incident to the image sensor 104 and slightly changes the optical path of the light incident to the image sensor 104 under the control of the moire pattern detecting unit 102.

Figure 2B:
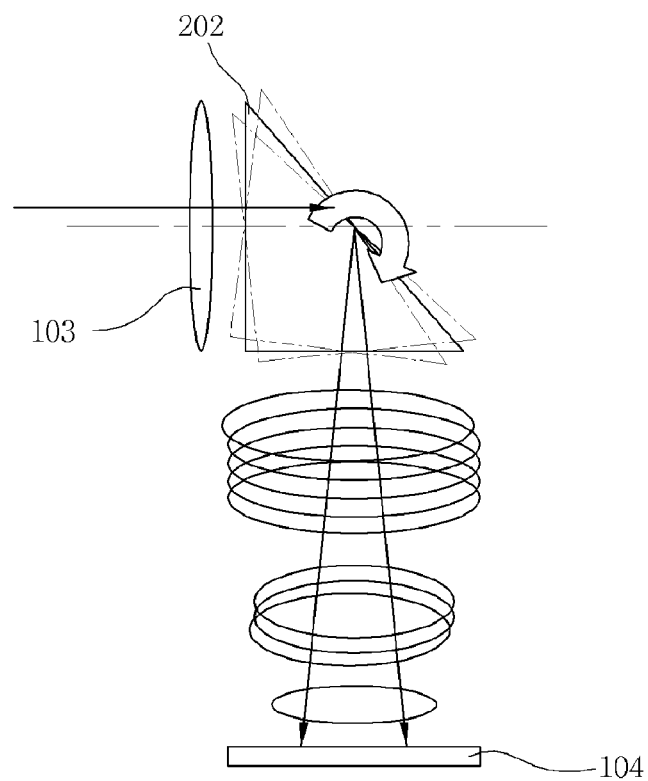

FIGS. 2A and 2B show a structure of the optical path adjusting unit 101. Referring to FIGS. 2A and 2B, the optical path adjusting unit 101 includes an optical filter 201 or total reflection prism 202 which is interposed between the lens unit 103 and the image sensor 104 to transfer light to the image sensor 104.

In this case, the optical filter 201 or the total reflection prism 202 is capable of changing an optical path of light incident to the image sensor 104 by rotating within a predetermined angle, as shown in FIGS. 2A and 2B. The optical path adjusting unit 101 may further include an additional driving device (not shown) to rotate the optical filter 201 or the total reflection prism 202.

Although not illustrated in drawings, the optical path adjusting unit 101 may move the lens unit 103 or the image sensor 104 to change the optical path. For example, the optical path can be changed by slightly moving the image sensor 104 upwards or downwards perpendicularly to an optical axis.

The optical path adjusting unit 101 moves an optical path by a distance of at least one pixel, while the image sensor 104 is exposed to light, in order to perform low-pass filtering under the control of the moire pattern detecting unit 102. The pixel is referred to a unit image pick-up element of the image sensor 104.

Figure 3:
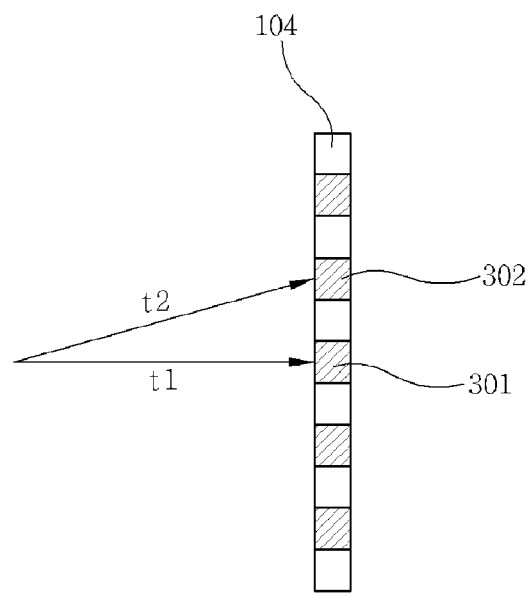
FIG. 3 shows an image sensor in order to explain a principle of how a moire pattern is removed when an optical path of light is changed according to an embodiment of the present invention.

With reference to FIG. 3, a description will be given of a principle of how a moire pattern is removed by means of low-pass filtering when an optical path of light incident to the image sensor 104 is changed.

Referring to FIG. 3, light is originally made incident to a pixel A 301 at a time t1 and then the light is made incident to an adjacent pixel B at a time t2 by the optical path adjusting unit 101 so that the optical path is changed. Here, the time between t1 and t2 indicates a time period when the image sensor 104 is exposed to light to photograph an object, and the pixel A 301 and the pixel B 302 indicate unit image pick-up elements of the image sensor 104.

That is, since the optical path of the light incident to the image sensor 104 is changed from one pixel (for example, the pixel A 301) to an adjacent pixel (for example, the pixel B 302) for a particular period of time to photograph an object, it is possible that the incident light is temporally divided and focused on the image sensor 104. As the result, the light is blurred and the high-frequency components are cut off, and hence the moire pattern can be removed.

Referring to FIG. 1 again, the moire pattern detecting unit 102 determines if a moire pattern occurs, and controls the optical path adjusting unit 101 to change the optical path when it is determined that there is a moire pattern, as described above. That is, the operation of the optical path adjusting unit 101 depends on the determination result of the moire pattern detecting unit 102.

Figure 4:
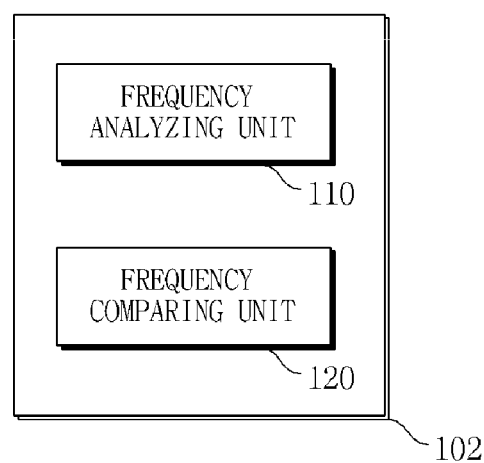
FIG. 4 is a block diagram of a moire pattern detecting unit in FIG. 1.

To this end, the moire pattern detecting unit 102 may include a frequency analyzing unit 110 and a frequency comparing unit 120 (referring to FIG. 4).

The frequency analyzing unit 110 analyzes a preview image based on a frequency domain to obtain an image frequency of the preview image. The preview image may be an image displayed in the image display unit 106 before the object is actually photographed, and the image frequency of the preview image can be obtained by analyzing an image signal of the preview image based on a frequency domain. For instance, the frequency analyzing unit 110 can obtain an image frequency of the preview image in a spectrum form by performing a fast-Fourier transform on the image signal obtained by the image sensor 104.

The frequency comparing unit 120 compares the image frequency of the preview image obtained by the frequency analyzing unit 110 and a spatial frequency of the image sensor 104. The spatial frequency of the image sensor 104, which is a unique property of the image sensor 104, can be obtained by taking the inverse of a distance between unit image pick-up devices which comprise the image sensor 104.

Furthermore, the frequency comparing unit 120 compares the image frequency of the preview image and the spatial frequency of the image sensor 104 in order to determine whether the image frequency of the preview image is present in a particular region around the spatial frequency of the image sensor 104. The particular region may range between about ±25 percent of the spatial frequency of the image sensor 104.

If the image frequency of the preview image is present in the particular region around the spatial frequency of the image sensor 104, there is a high possibility of the occurrence of a moire pattern due to frequency interference between the image and the sensor. Therefore, it can be determined that the moire pattern is created when the image frequency is present in the particular region around the spatial frequency of the image sensor 104.

Figure 5:
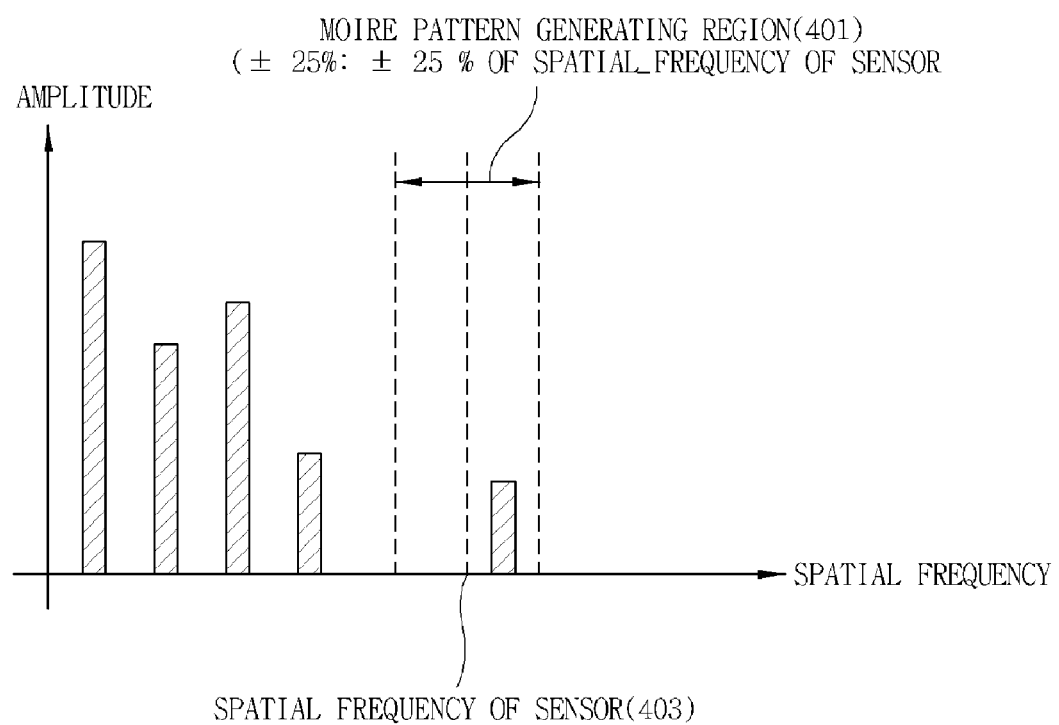
FIG. 5 is a graph showing a result of analyzing a frequency of a preview image and a spatial frequency of an image sensor.

FIG. 5 is a graph showing a spectrum obtained by analyzing the preview image based on a frequency domain. Referring to FIG. 5, a moire pattern generating region 401 is set to range between ±25 percent of a spatial frequency of the image sensor.

The moire pattern detecting unit 102 analyzes the preview image based on a frequency domain to obtain the image frequency of the preview image, as shown in FIG. 5, and determine if the obtained image frequency is present in the moire pattern generating region 401. When the image frequency of the preview image is present in the moire pattern generating region 401, it is determined that the moire pattern is generated.

Figure 6:
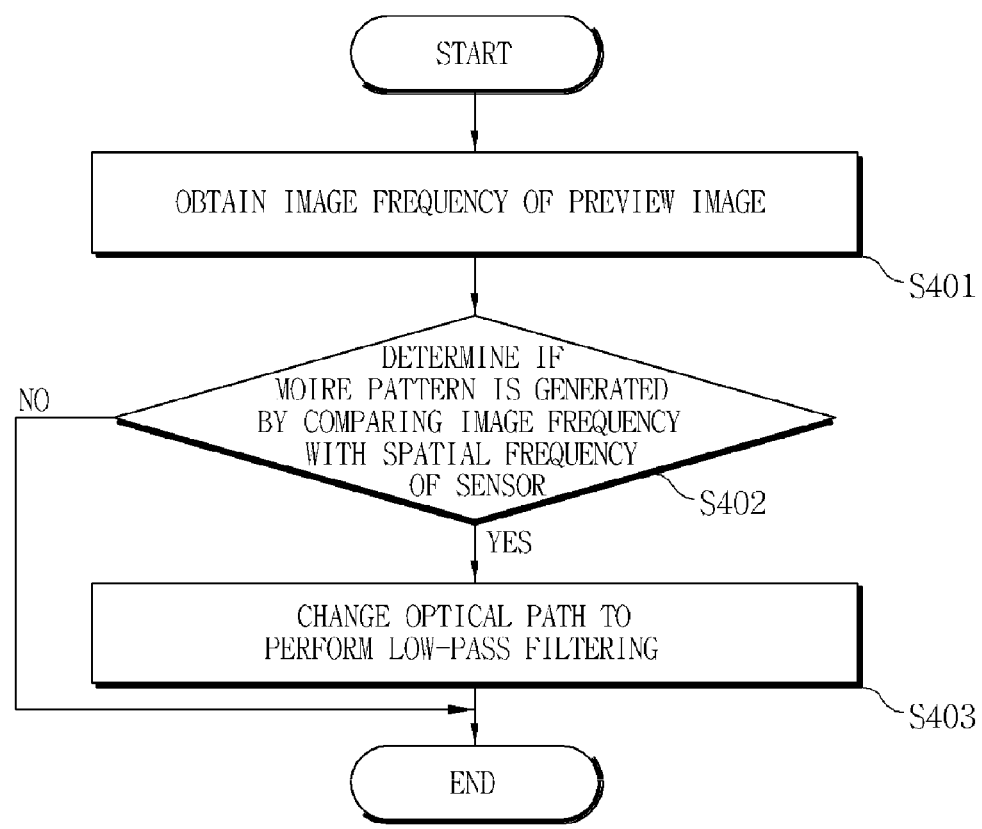
FIG. 6 is a flowchart of a method of removing a moire pattern according to an embodiment of the present invention.

A method of removing a moire pattern of a digital imaging device according to an embodiment of the present invention will now be described with reference to FIG. 6 in conjunction with FIG. 1.

When a user operates a digital imaging device to photograph an object, light from outside is focused on the image sensor 104 so that a preview image can be obtained.

The moire pattern detecting unit 102 analyzes the preview image based on a frequency domain in order to obtain an image frequency of the preview image (operation S401). Image information of the preview image can be input from the image sensor 104, and an image frequency in a spectrum form, as shown in FIG. 5, can be obtained by fast-Fourier transforming the input image information.

Then, the moire pattern detecting unit 102 determines whether the moire pattern is created based on the obtained image frequency of the preview image and the spatial frequency of the image sensor 104 (operation S402). The spatial frequency of the image sensor 104 may be an inverse value of a distance between unit image pick-up devices that comprise the image sensor 104. In this case, the moire pattern detecting unit 102 may determine whether the moire pattern is generated depending on if a particular frequency of the preview image that has been obtained in operation S401 is detected around the spatial frequency of the image sensor 104.

For example, if the image frequency of the preview image is present in a particular region around the spatial frequency of the image sensor 104, it can be determined that the moire pattern is generated, and the particular region may range between ±25 percent of the spatial frequency of the image sensor 104.

When it is determined that there is the moire pattern, the moire pattern detecting unit 102 issues a predetermined control signal to the light optical path adjusting unit 101, and the optical path adjusting unit 101 changes an optical path of light incident to the image sensor 104 to remove the moire pattern (operation S403). In this case, the optical path may be moved by a distance of at least one pixel while the image sensor is exposed to light in order to photograph an object, and thus low-pass filtering is performed.

Thus, according to the structure and method described above, the moire pattern detecting unit 102 determines whether a moire pattern is generated and then controls the optical path adjusting unit 101 only when it is determined that a moire pattern is created or when a moire pattern is highly likely to be generated, and hence clearness of an image is secured and the moire pattern can be removed under an optimum environment.

In addition, since the optical path is changed while the image sensor 104 is exposed to light, low-pass filtering is automatically performed simultaneously upon finishing exposure, and hence there is no need for additional image correction.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus removing a moire pattern of a digital imaging device, the apparatus comprising:
   a moire pattern detecting unit which determines whether or not a moire pattern is generated, by comparing an image frequency of a preview image and a spatial frequency of an image sensor, wherein the spatial frequency is defined based on the inverse of a distance between pixels of the image sensor for obtaining the preview image; and
   an optical path adjusting unit which changes an optical path of light incident to the image sensor to perform low-pass filtering when it is determined by the moire detecting unit that a moire pattern is generated, wherein the optical path adjusting unit moves the optical path by a distance of at least one pixel while the image sensor is exposed to light under the control of the moire pattern detecting unit.

2. The apparatus of claim 1, wherein the optical path adjusting unit includes an optical filter or total reflection prism and the optical path is changed by the rotation of the optical filter or the total reflection prism.

3. The apparatus of claim 1, wherein the optical path adjusting unit moves a position of the image sensor or a lens unit that transfers light to the image sensor to change the optical path.

4. The apparatus of claim 1, wherein the moire pattern detecting unit determines that a moire pattern is created when an image frequency of the preview image is in a particular region around a spatial frequency of the image sensor.

5. An apparatus removing a moire pattern of a digital imaging device, the apparatus comprising:
   a moire pattern detecting unit which determines whether or not a moire pattern is generated, using an image frequency of a preview image and a spatial frequency of an image sensor; and
   an optical path adjusting unit which changes an optical path of light incident to the image sensor to perform low-pass filtering when it is determined by the moire detecting unit that a moire pattern is generated, wherein the moire pattern detecting unit determines that a moire pattern is created if the image frequency of the preview image is present in a region ranging between ±25 percent of the spatial frequency of the image sensor.

6. A method of removing a moire pattern of a digital imaging device, the method comprising:
   obtaining an image frequency of a preview image;
   determining whether or not a moire pattern is created by comparing the obtained image frequency of the preview image and a spatial frequency of the image sensor, wherein the spatial frequency is defined based on the inverse of a distance between pixels of the image sensor for obtaining the preview image; and removing a moire pattern by changing an optical path of light incident to the image sensor when it is determined that a moire pattern is present, wherein, in the removing of the moire pattern, the optical path is moved by a distance of at least one pixel while the image sensor is exposed to light.

7. The method of claim 6, wherein, in the determining of whether or not the moire pattern is created, it is determined that there is a moire pattern when the image frequency of the preview image is present in a particular region around the spatial frequency of the image sensor.

8. A method of removing a moire pattern of a digital imaging device, the method comprising:

obtaining an image frequency of a preview image;

determining whether or not a moire pattern is created by using the obtained image frequency of the preview image and a spatial frequency of the image sensor; and removing a moire pattern by changing an optical path of light incident to the image sensor when it is determined that a moire pattern is present, wherein in the determining of whether or not the moire pattern is created, it is determined that there is a moire pattern when the image frequency of the preview image is present in a range of ±25 percent of the spatial frequency of the image sensor.

* * * * *